United States Patent Office 3,399,152
Patented Aug. 27, 1968

3,399,152
BLACK ACRYLIC COATING COMPOSITION
Robert F. Jamrog, Livonia, and Raymond S. Podlewski, Inkster, Mich., assignors to Interchemical Corporation, a corporation of Ohio
No Drawing. Continuation-in-part of application Ser. No. 265,041, Mar. 14, 1963. This application Apr. 14, 1967, Ser. No. 630,817
8 Claims. (Cl. 260—17)

ABSTRACT OF THE DISCLOSURE

An acrylic coating composition comprising a dispersion of a pigment in a solvent solution containing a film-forming copolymer of t-butylaminoethyl methacrylate and at least one other monomer containing a $CH_2=C<$ group.

Cross reference to related applications

This is a continuation-in-part of prior copending application Ser. No. 265,041, filed Mar. 14, 1963, for "Coating Composition."

Background of the invention

Acrylic lacquers may be defined as coating compositions containing a pigment, solvent and a film-forming material comprising polymers in which the esters of acrylic and methacrylic acid predominate. Other film-forming constituents may be included in the composition, however, the acrylic polymer is the principal film-forming constituent.

Acrylic lacquers have been widely employed in recent years, particularly in the automotive industry. Acrylic coating compositions possess outstanding properties of durability and gloss retention. These two factors have contributed importantly to the widespread acceptance of these coating materials.

The consumers of acrylic lacquers have recently requested a lacquer having a degree of thermoplasticity not heretofore provided in such coating compositions. It has been relatively easy to provide the desired thermoplastic properties in most colors. However, it has been difficult to provide a black acrylic lacquer which is jet in color and still sufficiently thermoplastic in nature to flow out to a glossy film when baked.

Most known black acrylic lacquers are not really black, that is, jet black. They have a brownish-gray undertone which is readily apparent when such lacquers are compared with, for example, black nitrocellulose lacquers. For this reason, most of the black acrylic lacquers have only been able to compete effectively with other jet black coating compositions when nitrocellulose is incorporated therein. This has been true regardless of the pigment used. The presence of nitrocellulose inhibits the thermoplastic nature of the coating composition and from this standpoint, is considered to be undesirable.

Another difficulty in the preparation of black acrylic coatings is the obtaining of a satisfactory dispersion of carbon black pigment into the coating material. In the past, the practice has been to disperse the black pigment in nitrocellulose with or without other dispersing agents. This, of course, necessitates the incorporation of nitrocellulose into the acrylic coating composition.

Sumary of the invention

We have discovered a class of polymers made from esters of acrylic and methacrylic acid which contain t-butylaminoethyl methacrylate and in which carbon black pigment can be efficiently dispersed without the use of nitrocellulose. Black acrylic coating compositions made with these polymers have the usual durability and gloss retention characteristics of conventional acrylic lacquers.

Coating compositions formulated from these polymers will yield jet black coatings equal or superior to black nitrocellulose lacquers. Additionally, we have found that acrylic polymers containing t-butylaminoethyl methacrylate have excellent thermoplastic characteristics.

It is, therefore, an object of the invention to provide an acrylic lacquer which when pigmented with a black pigment, such as carbon black, will have a satisfactory jet black color; to provide an acrylic polymer containing t-butylaminoethyl methacrylate, which polymer can be utilized to formulate a black coating composition in which the presence of nitrocellulose is not necessary; to provide an acrylic polymer containing t-butylaminoethyl methacrylate which has excellent thermoplastic characteristics; and to provide an acrylic film-forming material free from nitrocellulose but which has outstanding durability and gloss retention characteristics when incorporated into an acrylic lacquer composition.

Description of the preferred embodiments

Among the monomers which may be polymerized with t-butylaminoethyl methacrylate are included acrylic acid, methacrylic acid, methyl acrylate, methyl methacrylate, ethyl acrylate, ethyl methacrylate, isopropyl methacrylate, n-butyl acrylate, t-butyl methacrylate, cyclohexyl acrylate, cyclohexyl methacrylate, benzyl acrylate, benzyl methacrylate, n-hexyl acrylate, n-hexyl methacrylate, 2-ethyl hexyl acrylate, 2-ethyl hexyl methacrylate, lauryl methacrylate, stearyl methacrylate, styrene and vinyl toluene. In general, it is preferred that the monomer utilized contain a single $CH_2=C<$ group in terminal position. An especially preferred group of monomers includes the esters of acrylic acid and methacrylic acid, styrene and vinyl toluene.

The acrylic polymer preferably contains from about 0.1 to 5% by weight (0.04 mol percent to about 9.6 mol percent) of t-butylaminoethyl methacrylate with the remainder of the polymer being one or more members from the above-identified class of monomers. If less than 0.1% by weight (0.04 mol percent) of t-butylaminoethyl methacrylate is used, the desirable characteristics of the vinyl polymer do not appear to a sufficient extent. The use of more than 5% by weight (9.6 mol percent) of t-butylaminoethyl methacrylate tends to result in poor color characteristics. For most purposes, the copolymers of the present invention preferably contain from about 1 mol percent to about 2 mol percent t-butylaminoethyl methacrylate as typified by the formulations enumerated in the examples hereafter provided.

Polymers of the invention can be produced by solution polymerization at temperatures of approximately 100° C. in the presence of free radical forming catalysts such as, for example, benzoyl peroxide, lauryl peroxide and azobisisobutyronitrile. Azobisisobutyronitrile is preferred.

Conventional solvents and diluents can be used in the solution polymerization of the polymers. These solvents and diluents can also be utilized as solvents for coating compositions containing the polymers. Examples of useful solvents are toluene, xylene, butyl acetate, acetone, methyl ethyl ketone, isopropyl alcohol, ethylene glycol monoethyl ether acetate and butylene glycol monoethyl ether acetate. Other aliphatic, cycloaliphatic, and aromatic hydrocarbons, esters, ethers, ketones, and alcohols which are conventionally used in acrylic lacquers may be utilized.

A wide variety of conventional plasticizers used in acrylic lacquers can be used in the compositions of this invention in conventional amounts. Examples of such plasticizers are butyl benzyl phthalate, dibutyl phthalate, butyl cyclohexyl phthalate, 2 - ethyl hexyl benzyl phthalate, di - 2 - ethyl hexyl phthalate, di - iso - decyl phthalate and mixtures of the former. Butyl benzyl phthalate yields coatings having a particularly good overall balance of properties and this material is preferred. Compositions containing 10 to 40% by weight of plasticizer based on the weight of the film-forming material are usually preferred.

Coating compositions prepared from the acrylic polymer of the invention preferably include cellulose acetate butyrate as a film-forming modifier. Cellulose acetate butyrate is preferably utilized in amounts of from 10 to 30% by weight of the total weight of the film-forming material plus plasticizer.

Coating compositions containing the polymers of this invention may also include conventional additives such as inhibitors, flow-control agents and the like.

The amount of pigment utilized varies with the particular composition under consideration. It will be appreciated that any desired pigment color may be used. However, the difficulty has been with black. It is preferred to use from about 1 to 5 parts by weight of carbon black pigment per 100 parts of the total weight of the film-forming material and plasticizer.

Coating compositions can be prepared in accordance with this invention by conventional lacquer formulating techniques. One desirable method of preparing coating compositions in accordance with the invention is to mill the pigment, part of the polymer and a portion of the solvent until the desired mill base is achieved. This mill base is then intermixed with the remainder of the polymer. To this mixture is added a plasticizer, other additives and the remainder of the solvent. Additional solvent may then be added to dilute the composition to a suitable application viscosity. The composition may then be applied by any conventional technique, such as spraying, dipping or brushing. Applied films will dry at room temperature. However, drying is preferably accelerated by elevating the temperature to from about 150 to 300° F. for from 10 minutes to 1 hour.

Black coating compositions of the invention are particularly characterized by the outstanding durability and gloss retention of applied films thereof. These films have excellent jet black color and are thermoplastic.

The coating compositions can be used, if used, directly on bare substrates. However, the composition is preferably applied over conventional primers or sealers. Coating compositions of the invention are particularly suitable in finishing systems for steel, especially steel automobile bodies. It will be appreciated, however, that the composition can be used in any desired finishing system.

Following are examples which are illustrative, but not limitative of the invention:

EXAMPLE I

Preparation of the coating composition

The following materials were reacted in a vessel for 8 hours at 95° C. to form polymer solution A:

|  | Mols | Parts by weight |
| --- | --- | --- |
| Methyl methacrylate | 3.17 | 317 |
| Ethyl acrylate | .46 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% by weight solution of a polymer comprising 85.5% by weight (86.4 mol percent) methyl methacrylate, 12.5% by weight (12.6 mol percent) ethyl acrylate and 2% by weight (1 mol percent) t-butylaminoethyl methacrylate. The solution had a Gardner-Holdt viscosity of U.

A mill base was prepared by grinding together the following materials:

| | Parts by weight |
| --- | --- |
| Carbon black pigment | 35 |
| Polymer solution A | 452 |
| Butylene glycol monoethyl ether acetate | 39 |
| Acetone | 238 |

Part of the above mill base was then mixed with the following materials:

| | Parts by weight |
| --- | --- |
| Mill base | 240 |
| Polymer solution A | 223 |
| Cellulose acetate butyrate (20 second viscosity at 15% solids) | 105 |
| Cellulose acetate butyrate (1 to 3 second viscosity at 25% solids) | 64 |
| Butyl benzyl phthalate | 32 |
| Di-iso-decyl phthalate | 11 |
| Acetone | 87 |

The final composition was diluted to spraying viscosity (about 15% solids) with a solvent mixture consisting of acetone, toluene, xylene, ethylene glycol monoethyl ether acetate and lacquer diluent naptha in about 13:25:10:37:15 weight ratio. The resulting coating composition contained polymer, cellulose acetate butyrate, plasticizer, and carbon black pigment in a weight ratio of about 61:15:19:5.

Steel panels treated with conventional rust inhibitor were primed with a conventional primer-surfacer used in the automotive industry. The coating composition of Example I was sprayed over the primed panels and baked 15 minutes at 220° F. to yield a topcoat about 2 mils thick.

The coated panels had a jet-black color equivalent to that of panels having a conventional topcoat of black nitrocellulose lacquer.

The thermoplastic nature of the coating composition was determined by baking the panels 10 minutes at a temperature of 190° F. The panels were cooled and wet sanded with No. 600 grit sandpaper. They were then rebaked for 30 minutes at 290° F. The sand scratches on the panels disappeared and a smooth, highly glossy surface resulted.

The applied films showed excellent durability and gloss retention when exposed in Florida for one year and were comparable to conventional acrylic lacquer coatings.

EXAMPLE II

The following materials were reacted in a vessel for 8 hours at 95° C.:

|  | Mols | Parts by weight |
| --- | --- | --- |
| Methyl methacrylate | 3.1 | 310 |
| Ethyl methacrylate | .40 | 46 |
| t-Butylaminoethyl methacrylate | .076 | 14 |
| Toluene |  | 504 |
| Methyl ethyl ketone |  | 126 |
| Azobisisobutyronitrile |  | 2 |

The resulting product was a 37% solution of a polymer comprising 83.5% by weight (86.4 mol percent) methyl methacrylate, 12.5% by weight (11.4 mol percent) ethyl methacrylate and 4% by weight (2.2 mol percent) t-butylaminoethyl methacrylate. The solution had a Gardner-Holdt viscosity of X. This product shall be referred to as polymer solution B.

EXAMPLE III

The following materials were reacted in a vessel for 8 hours at 95° C.:

|  | Mols | Parts by weight |
| --- | --- | --- |
| Methyl methacrylate | 3.17 | 317 |
| Butyl methacrylate | .324 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 85.5% by weight (89.8 mol percent) methyl methacrylate, 12.5% by weight (7.9 mol percent) butyl methacrylate and 2% by weight (1.1 mol percent) t-butylaminoethyl methacrylate. The solution had a Gardner-Holdt viscosity of X+. This polymer shall be called polymer solution C.

EXAMPLE IV

The following materials were reacted in a vessel for 8 hours at 95° C.:

|  | Mols | Parts by weight |
|---|---|---|
| Methyl methacrylate | 3.17 | 317 |
| Cyclohexyl methacrylate | .274 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 85.5% by weight (91 mol percent) methyl methacrylate, 12.5% by weight (7.9 mol percent) cyclohexyl methacrylate and 2% by weight (1.1 mol percent) t-butylaminoethyl methacrylate. The solution had a Gardner-Holdt viscosity of V—. This polymer shall be referred to as polymer solution D.

EXAMPLE V

The following materials were reacted in a vessel for 8 hours at 95° C.:

|  | Mols | Parts by weight |
|---|---|---|
| Methyl methacrylate | 3.22 | 322 |
| Butyl acrylate | .362 | 46 |
| t-Butylaminoethyl methacrylate | .0108 | 2 |
| Toluene |  | 504 |
| Methyl ethyl ketone |  | 126 |
| Azobisisobutyronitrile |  | 2 |

The resulting product was a 37% solution of a polymer comprising 87.0% by weight (90 mol percent) methyl methacrylate, 12.5% by weight (9.7 mol percent) butyl acrylate and 0.5% by weight (0.3 mol percent) t-butylaminoethyl methacrylate. The solution had a Gardner-Holdt viscosity of V+. This is identified as polymer solution E.

EXAMPLE VI

The following materials were reacted in a vessel for 8 hours at 95° C.:

|  | Mols | Parts by weight |
|---|---|---|
| Methyl methacrylate | 3.17 | 317 |
| Vinyl toluene | .39 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 85.5% by weight (88.1 mol percent) methyl methacrylate, 12.5% by weight (10.8 mol percent) vinyl toluene and 2% by weight (1.1 mol percent) t-butylaminoethyl methacrylate. The solution had a Gardner-Holdt viscosity of V—. This polymer shall be called polymer solution F.

EXAMPLE VII

The following materials were reacted in a vessel for 8 hours at 95° C.:

|  | Mols | Parts by weight |
|---|---|---|
| Methyl methacrylate | 3.17 | 317 |
| 2-ethyl hexyl acrylate | .25 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 85.5% by weight (91.7 mol percent) methyl methacrylate, 12.5% by weight (7.2 mol percent) 2-ethyl hexyl acrylate and 2% by weight (1.1 mol percent) t-butylaminoethyl methacrylate. The solution had a Gardner-Holdt viscosity of V+. This polymer is identified as polymer solution G.

EXAMPLE VIII

The following materials were reacted in a vessel for 8 hours at 95° C.:

|  | Mols | Parts by weight |
|---|---|---|
| Methyl methacrylate | 1.78 | 178 |
| Ethyl methacrylate | 1.59 | 181 |
| t-Butylaminoethyl methacrylate | .057 | 10.5 |
| Toluene |  | 504 |
| Methyl ethyl ketone |  | 126 |
| Azobisisobutyronitrile |  | 2 |

The resulting product was a 37% solution of a polymer comprising 48% by weight (51.9 mol percent) methyl methacrylate, 49% by weight (46.4 mol percent) ethyl methacrylate and 3% by weight (1.7 mol percent) t-butylaminoethyl methacrylate. The solution had a Garnder-Holdt viscosity of R. This polymer shall be called polymer solution H.

EXAMPLE IX

The following materials were reacted in a vessel for 8 hours at 95° C.:

|  | Mols | Parts by weight |
|---|---|---|
| Methyl methacrylate | 1.81 | 181 |
| Butyl methacrylate | 1.27 | 181 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 49% by weight (58 mol percent) methyl methacrylate, 49% by weight (40.8 mol percent) butyl methacrylate and 2% by weight (1.2 mol percent) t-butylaminoethyl methacrylate. The solution had a Gardner-Holdt viscosity of Q+. This polymer shall be called polymer solution I.

EXAMPLE X

The following materials were reacted in a vessel 8 hours at 95° C.:

|  | Mols | Parts by weight |
|---|---|---|
| Methyl methacrylate | 2.71 | 271 |
| Ethyl acrylate | .46 | 46 |
| Styrene | .44 | 46 |
| t-Butylaminoethyl methacrylate | .038 | 7 |
| Toluene |  | 504 |
| Methyl ethyl ketone |  | 126 |
| Azobisisobutyronitrile |  | 2 |

The resulting product was a 37% solution of a polymer comprising 73% by weight (74.3 mol percent) methyl methacrylate, 12.5% by weight (12.6 mol percent) ethyl acrylate, 12.5% by weight (12.1 mol percent) styrene and 2% by weight (1 mol percent) t-butylaminoethyl methacrylate. The solution had a Gardner-Holdt viscosity of W—. This polymer is referred to as polymer solution J.

Polymer solutions B through J were individually substituted for polymer solution A in the coating composition in Example I. The resulting black coating compositions were then applied to primed panels and tested under the same conditions as Example I. Each of these compositions exhibited properties substantially equal and similar to the coating composition of Example I.

Having thus described our invention, we claim:

1. A black acrylic coating composition consisting essentially of a black pigment dispersed in a solution composed essentially of an organic solvent selected from the group consisting of aliphatic, cycloaliphatic, and aromatic hydrocarbons, esters, ethers, ketones, alcohols, and mixtures thereof and a film-forming material consisting essentially of a copolymer of a mixture consisting of from about 0.04 mol percent to about 9.6 mol percent of t-butylaminoethyl methacrylate and from about 90.4 mol percent to about 99.96 mol percent of at least one other monomer containing a $CH_2=C<$ group.

2. The coating composition as defined in claim 1 wherein said other monomer is selected from the group consisting of acrylic acid, methacrylic acid, methyl acrylate, methyl methacrylate, ethyl acrylate, ethyl methacrylate, isopropyl methacrylate, n-butyl acrylate, butyl methacrylate, cyclohexyl acrylate, cyclohexyl methacrylate, benzyl acrylate, benzyl methacrylate, n-hexyl acrylate, n-hexyl methacrylate, 2-ethyl hexyl acrylate, 2-ethyl hexyl methacrylate, lauryl methacrylate, stearyl methacrylate, styrene and vinyl toluene, as well as mixtures thereof.

3. The coating composition as defined in claim 1 further including a compatible plasticizer in an amount of from about 10% to about 40% by weight of said film-forming material present.

4. The coating composition as defined in claim 3 wherein said plasticizer is selected from the group consisting of butyl benzyl phthalate, dibutyl phthalate, butyl cyclohexyl phthalate, 2-ethyl hexyl benzyl phthalate, di-2-ethyl hexyl phthalate, di-iso-decyl phthalate, as well as mixtures thereof.

5. The coating composition as defined in claim 3 wherein said solution additionally contains cellulose acetate butyrate as a film-forming modifier, said cellulose acetate butyrate present in an amount of from about 10% to about 30% by weight of the total weight of said film-forming material and said plasticizer present.

6. The coating composition as defined in claim 3 wherein said black pigment is present in an amount of from about one part to about five parts by weight per 100 parts of the total weight of said film-forming material and said plasticizer present.

7. The coating composition as defined in claim 1 wherein said t-butylaminoethyl methacrylate is present in an amount of from about 1 mol percent to about 2 mol percent.

8. The coating composition as defined in claim 7 wherein said monomer consists of a mixture of methyl methacrylate and butyl methacrylate.

No references cited.

WILLIAM H. SHORT, *Primary Examiner.*

E. NIELSEN, *Assistant Examiner.*